United States Patent [19]

Wesling et al.

[11] 4,381,479

[45] Apr. 26, 1983

[54] ELECTRIC MOTOR CHOPPER CONTROL APPARATUS AND METHOD

[75] Inventors: Henry J. Wesling, Pittsburgh; James H. Franz, Jr., Murrysville, both of Pa.

[73] Assignee: Westinghouse Electric Corp., Pittsburgh, Pa.

[21] Appl. No.: 225,227

[22] Filed: Jan. 15, 1981

[51] Int. Cl.³ .............................................. H02P 5/06
[52] U.S. Cl. ..................................... 318/317; 318/341
[58] Field of Search ............... 318/317, 318, 326, 327, 318/341

[56] References Cited

U.S. PATENT DOCUMENTS

| | | | |
|---|---|---|---|
| 3,601,673 | 8/1971 | Mason | 318/317 X |
| 3,993,942 | 11/1976 | Schmidt et al. | 318/317 |
| 4,032,825 | 6/1977 | Klimo | 318/341 X |
| 4,037,145 | 7/1977 | Bailey et al. | 318/341 |
| 4,119,898 | 10/1978 | Morton et al. | 318/341 |

*Primary Examiner*—J. V. Truhe
*Assistant Examiner*—W. E. Duncanson, Jr.
*Attorney, Agent, or Firm*—R. G. Brodahl

[57] ABSTRACT

A programmed microprocessor controller chopper apparatus for an electric motor is responsive to an operating condition of the chopper such as at least one of the commutation capacitor charge voltage and the level of motor current for determining the desired commutation circuit operation for that chopper apparatus in relation to the provision of an OFF control pulse in relation to an ON control pulse every cycle of the microprocessor program operation.

10 Claims, 16 Drawing Figures

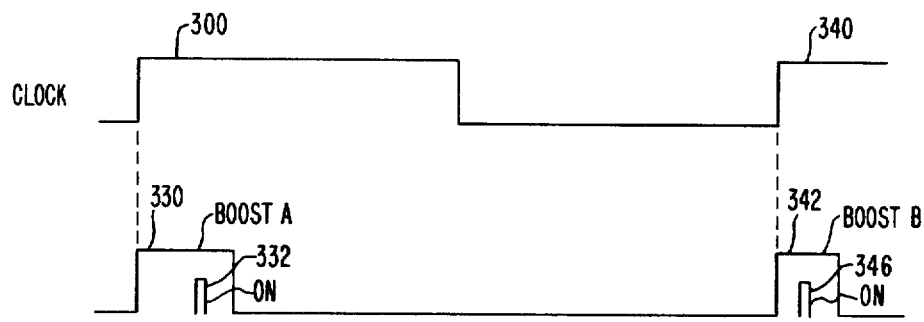
FIG. 8
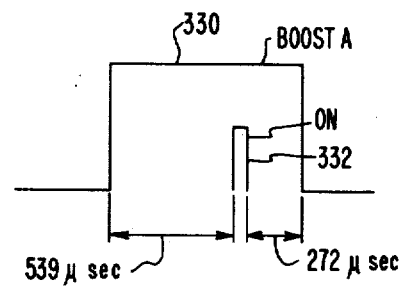
FIG. 9
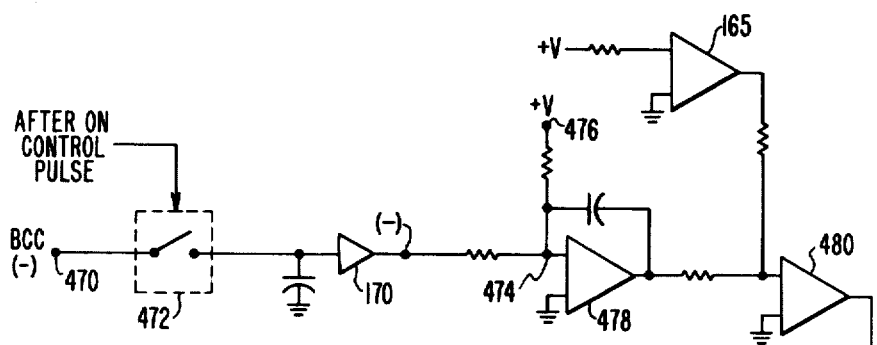
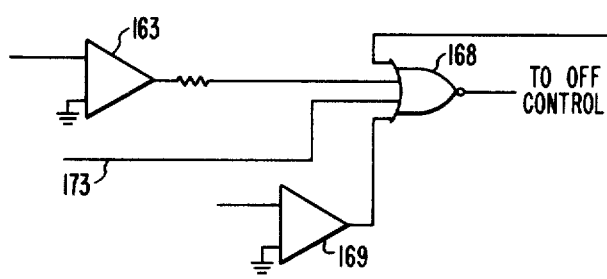
FIG. 14

ELECTRIC MOTOR CHOPPER CONTROL APPARATUS AND METHOD

CROSS-REFERENCE TO RELATED APPLICATION AND PATENT

The present application is related to a pending patent application Ser. No. 968,950, which was filed Dec. 13, 1978 by F. J. Prines et al. and U.S. Pat. No. 4,090,115 of J. H. Franz, Jr., which are assigned to the same assignee and the disclosures of which are incorporated herein by reference.

BACKGROUND OF THE INVENTION

The present invention relates to the application of thyristor chopper apparatus for determining the electric brake operation of a series propulsion motor and more particularly to control apparatus including a microprocessor that is programmed for the desired control of such thyristor chopper apparatus.

In an article entitled "Propulsion Control for Passenger Trains Provides High-Speed Service" published in the Westinghouse Engineer for September, 1970 at pages 143 to 149 and in an article entitled "Alternative Systems for Rapid Transit Propulsion and Electric Braking" published in the Westinghouse Engineer for March, 1973 at pages 34 to 41, there is described a thyristor chopper control system for propulsion and electric braking of transit vehicles. The thyristor chopper provides a propulsion system that is superior in smoothness and ease of maintaining a given speed which latter feature provides the desired automatic train control. In addition, the thyristor system makes regenerative braking practical because the response is fast enough to continuously match regenerated voltage to line voltage.

It is known in the prior art as disclosed in U.S. Pat. No. 4,095,153 of T. C. Matty et al. to use a dynamic braking control chopper apparatus for a vehicle electric motor propulsion system, with a regulator turning on the chopper when the motor current goes below a predetermined level for increasing motor current and the regulator turning off the chopper when the motor current goes above a second predetermined level for decreasing the motor current.

It is known as disclosed in U.S. Pat. No. 4,090,115 to provide a boost pulse to control the dead time around the ON control pulse in relation to the OFF control pulse of the main chopper for controlling the commutation circuit of the main thyristor. This commutation circuit requires a predetermined time interval to be established to prevent the firing ON of the main thyristor while the commutation circuit is operative relative to the commutation thyristor. The actual time length of the provided control boost pulse is determined by the required length of time for the associated program software to be executed for providing this boost pulse function. A microprocessor permits changing the execution path in the program to control the start time of the boost pulse, which is the last time an OFF pulse can be fired, and to control the start time of the ON pulse positioned in relation to the middle of the boost pulse. The trailing edge of each boost pulse is the first place the next OFF pulse can be fired to protect against running the OFF pulse into the next ON pulse and to protect against running the last ON pulse into the next OFF pulse. This avoids any problem with the thyristor memory to assure that the proper thyristor goes ON when desired. If the desired thyristor were not fired ON at the proper time, this could result in an undesired positive feedback operation to lock up the chopper system with the main chopper not functioning as desired.

SUMMARY OF THE PRESENT INVENTION

A programmed microprocessor apparatus establishes a boost signal for controlling the operation of an electric motor control chopper apparatus, with every cycle of the program operation including an ON control pulse positioned within the boost signal for establishing the desired commutation circuit operation in relation to the main thyristor of the chopper and assuring that the chopper will function properly. To enable an adequate recharge of the commutation circuit capacitor during the OFF pulse cycle of the chopper operation when the motor current is low, such as when dynamic brake build-up is desired, the microprocessor senses an operating condition of the chopper, such as the motor current, to determine an adaptive extension of the OFF control time period by one of modifying the boost pulse after the last OFF pulse and before the next ON pulse or by adjusting the position of the OFF control pulse to increase the time the main thyristor is OFF when desired to increase the available commutation capacitor charge voltage for improving the control of the chopper operation. It is within the scope of this invention to sense at least one of the motor current and the commutation capacitor charge voltage to adjust the provision time of the OFF pulse in relation to the ON pulse to increase the OFF time of the chopper when required to build up that commutation capacitor charge voltage.

BRIEF DESCRIPTION OF THE DRAWINGS

FIG. 8 shows the provision of an extended time duration boost pulse in relation to sensed motor current in accordance with the present invention;

FIG. 9 shows in greater detail the extended boost pulse of FIG. 8;

FIG. 14 shows a further embodiment of the present invention to provide a comparison of the commutation capacitor charge voltage with a reference bias voltage for controlling the OFF time of the chopper apparatus.

DESCRIPTION OF A PREFERRED EMBODIMENT

In relation to FIGS. 1 through 6, there is provided a more detailed description of the illustrated prior art propulsion control apparatus in the disclosure of U.S. Pat. No. 4,090,115, which is above cross-referenced.

Figure 1:
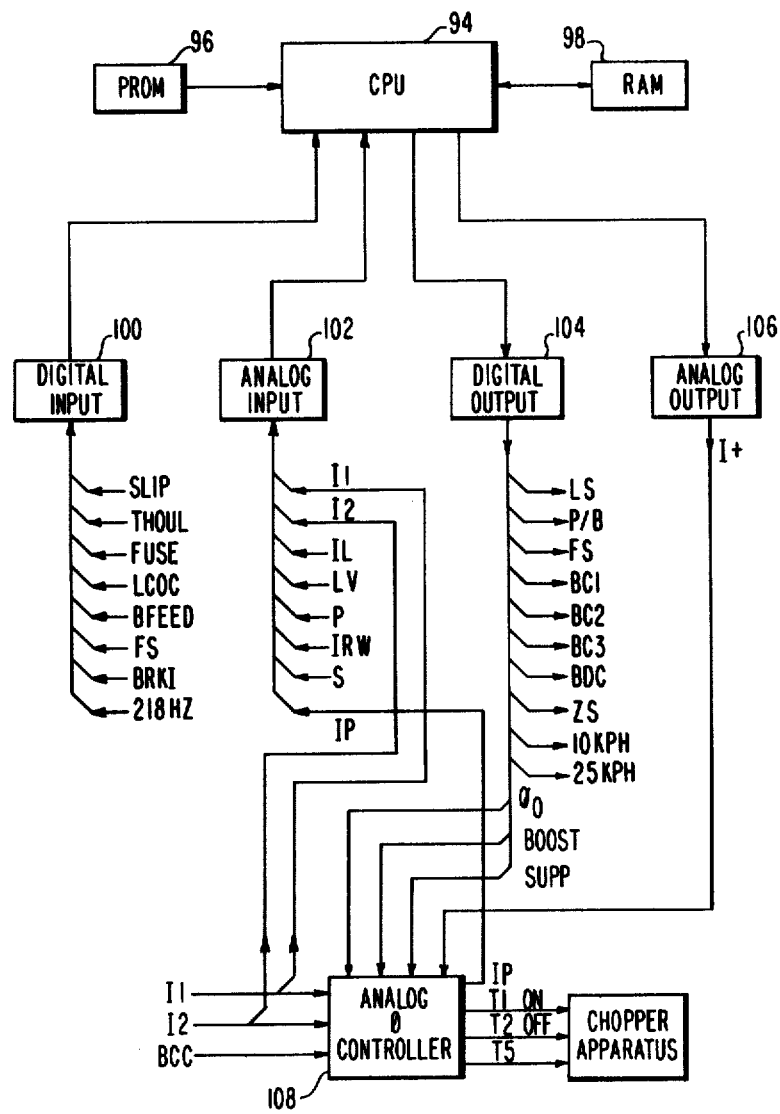
FIG. 1 is a functional showing of a prior art propulsion motor control apparatus in relation to the typical input signals and the output signals operative with such a control apparatus.

In FIG. 1, there is shown a functional illustration of a prior art chopper control apparatus including typical input signals and output signals operative therewith in relation to controlling a transit vehicle propulsion motors. A CPU microprocessor 94 is operative with a PROM programmable memory 96 and a scratchpad RAM random access memory 98 used for intermediate storage. A suitable application program, such as the program listings included in the Appendix A and Appendix B, is stored in the programmable memory 96. The microprocessor 94 can be an Intel 8080, the random access memory 98 can be an Intel 8101 and the programmable memory 96 can be an Intel 1702 programmable read-only memory, which items are currently available in the open marketplace. The illustrated digital input signals are supplied through digital input 100 from the transit vehicle associated with the chopper apparatus 101. The illustrated analog input signals are supplied through analog input 102, the illustrated digital output signals are supplied through digital output 104 and the analog output current request signal I+ is supplied through analog output 106 to the analog phase controller 108 operative to determine the control signal ON to fire the main thyristor T1, the control signal OFF to fire the commutating thyristor T2 and the control signal T5 for the dynamic brake T5 thyristor in the propulsion motor control chopper apparatus 101, as well known to persons skilled in this art and as described in the above referenced March 1973 article. The time period associated with turning the chopper apparatus ON and OFF is at a constant frequency of 218 hertz that defines the clock time interval for the program cycle and for checking the process operation. During each of the 218 time intervals per second, the application program cycle operates.

Figure 2:
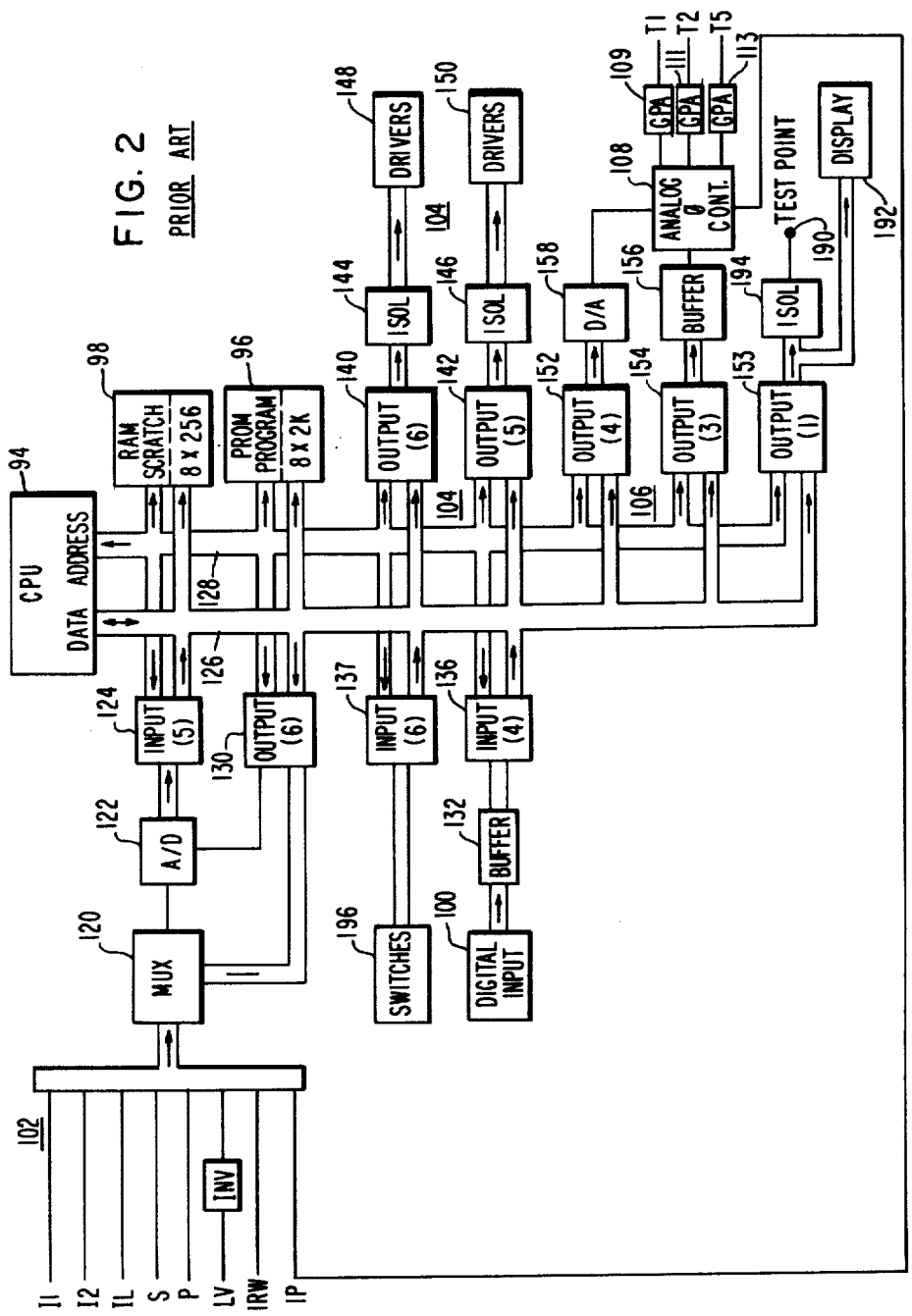
FIG. 2 illustrates the input signal operations and the output signal operations of the prior art control apparatus shown in FIG. 1.

In FIG. 2, there is illustrated the input signal operations and the output signal operations of the prior art chopper control apparatus including the microprocessor 94 operative with its random access memory 98 and its programmable memory 96. The analog input signals are supplied through the analog input 102 through the multiplexer 120, the analog to digital converter 122 and the input port 124 of the microprocessor 94 operative with a data bus 126 and an address bus 128. The address bus 128 and the data bus 126 operative through an output port 130 to control the multiplexer 120 and the analog to digital converter 122. The digital input signals are supplied through the digital input 100 operating through buffer 132 with the input port 136 operative with the data bus 126 and the address bus 128. The digital output signals are supplied through the digital output 104 including output ports 140 and 142 and respective isolation circuits 144 and 146 with drivers 148 and 150 in relation to the data bus 126 and the address bus 128. The analog output 106 is operative through output ports 152 and 154 through a buffer 156 and a digital to analog converter 158 with the analog phase controller 108. The output port 153 is operative through isolation circuit 194 with the provided test point 190 and is operative with display 192. The manual switches 196 are operative with input port 137 as shown. The analog phase controller 108 supplies, through the respective amplifiers 109, 111, and 113, the ON control pulse T1 for the main thyristor, the OFF control pulse T2 for the commutating thyristor, and the T5 dynamic brake control pulse.

Figure 3A:
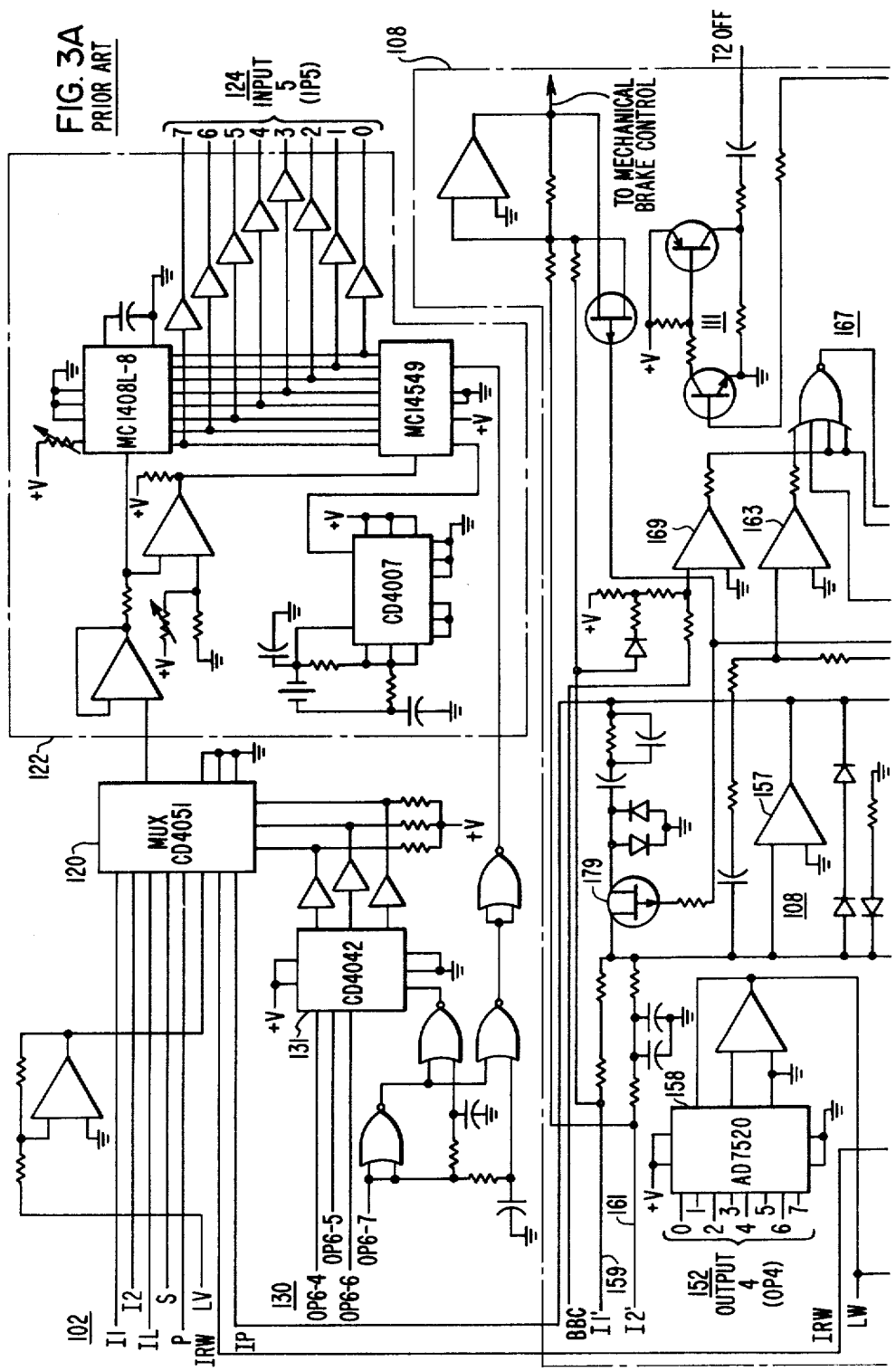
FIGS. 3A, 3B and 3C illustrate schematically the provided hardware interface of the prior art control apparatus shown in FIG. 2.
Figure 3B:
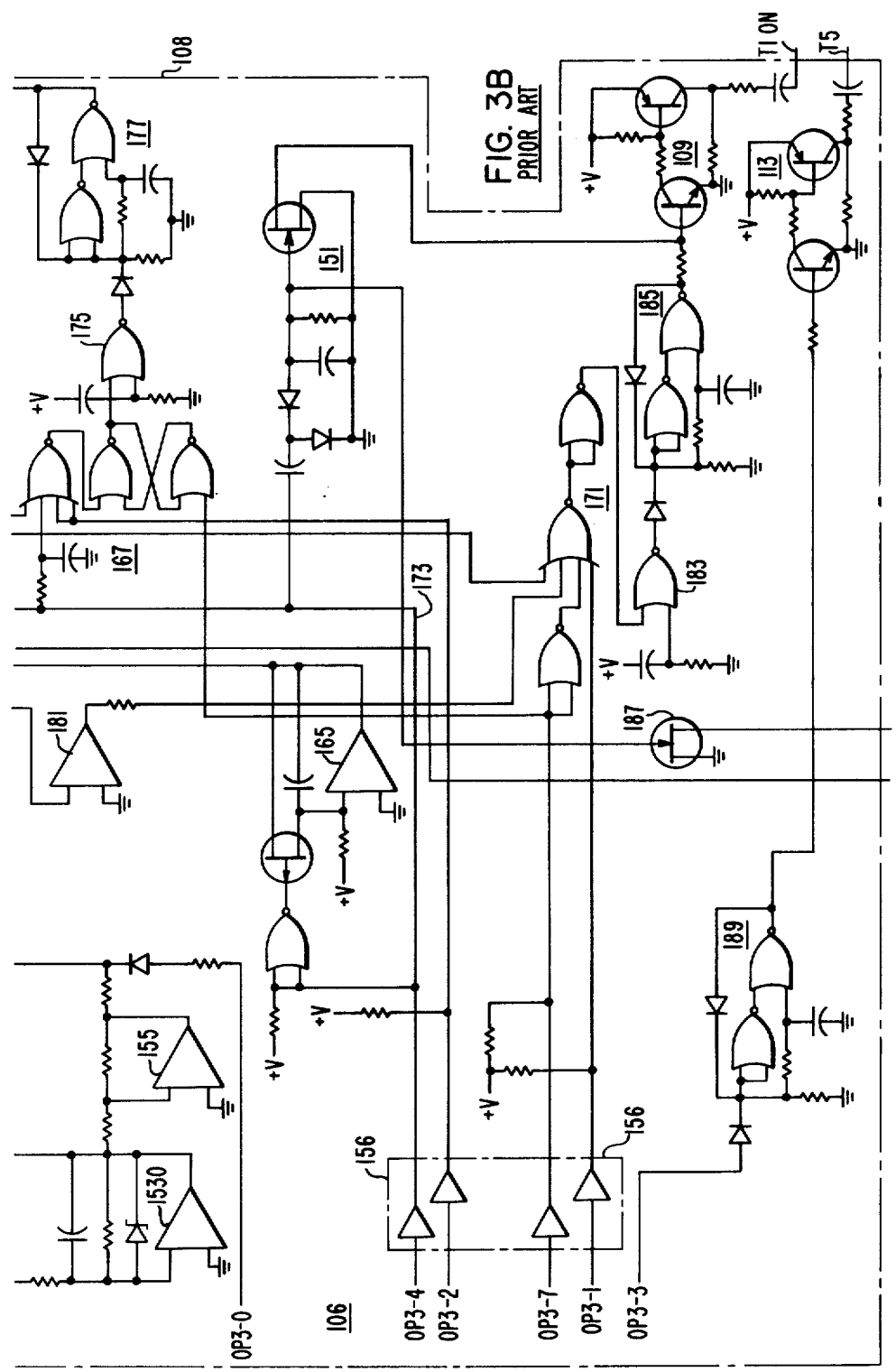
Figure 3C:
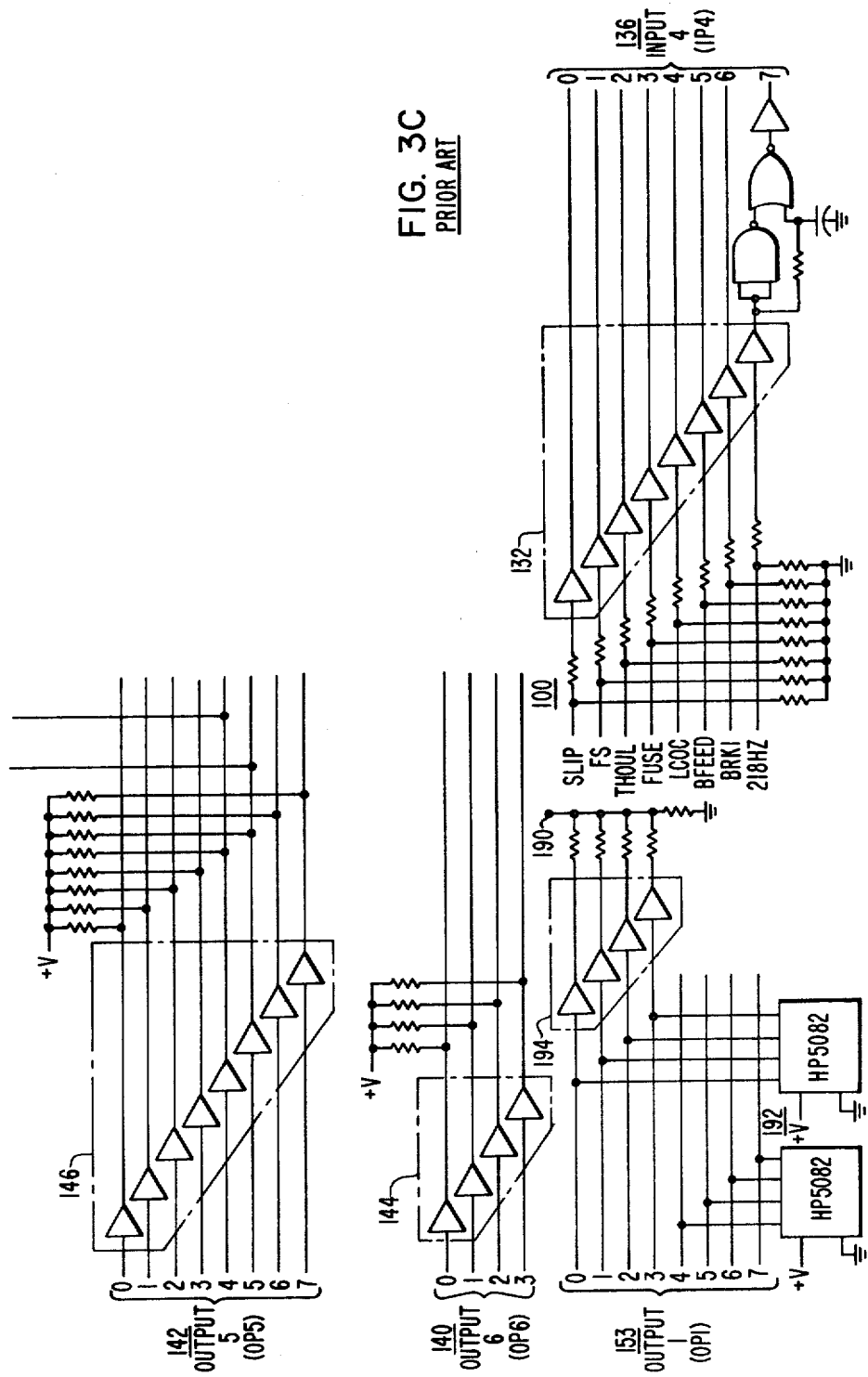

In FIGS. 3A, 3B and 3C, there is schematically illustrated the provided hardware interface of the prior art chopper logic control apparatus disclosed in U.S. Pat. No. 4,090,115. The analog input 102 is shown in FIG. 3A operative through multiplexer 120 and the analog to digital converter 122 with the input port 124 of the microprocessor. The output port 130 is operative with the register 131 to control the multiplexer 120 and the analog to digital converter 122. The output port 152 is shown operative with the digital to analog converter 158 and the analog phase controller 108. The output port 106 is shown operative through buffer amplifiers 156 with the drivers 109, 111 and 113 for controlling the respective thyristors T1, T2 and T5. The output port 142 is shown operative with the isolation amplifiers 146. The output port 140 is shown operative with the isolation amplifiers 144. The output port 153 is shown in FIG. 3B operative with isolation amplifiers 194 and test point 190 and operative with display 192.

The load weighed current request P signal is output by amplifier 1530. Then the buffer 155 leads to the phase controller amplifier 157, which responds to the current request signal from buffer 155 and the motor current signals I1 and I2 from lines 159 and 161, and the output of phase controller amplifier 157 is the requested OFF pulse position or the phase angle IP. The output of the amplifier 157 is compared by comparator 163 with the timing ramp from amplifier 165 which is reset by the computer each 218 hertz. The comparator 163 establishes when the phase angle signal IP has exceeded the timing ramp, and this would determine at the output of comparator 163 where the OFF pulse is positioned. The logic block 167 determines whether or not the OFF pulse position output of comparator 163 is actually used. For example, if comparator 169 determines there is too much current in the system, the OFF pulse will be fired and might inhibit or suppress the ON pulse in logic block 171 which is operative with the T1 ON pulse. The boost pulse comes from the computer and goes into the logic block 167 on line 173, and will fire an OFF pulse on the leading edge if comparator 169 has not already fired a pulse and suppress any further action out of the control system. The logic block 167 includes a flip-flop operative such that if an OFF pulse is fired once during a given program cycle, a second OFF pulse is not fired during that same program cycle.

Figure 4:
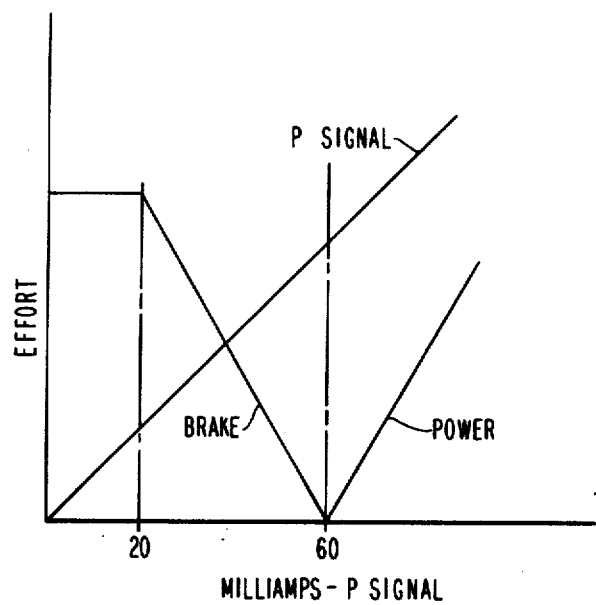
FIG. 4 shows the response of a prior art propulsion motor control apparatus to a well-known P signal.

In FIG. 4, there is illustrated the well-known response of the prior art propulsion motor control apparatus to the P signal 30. When the P signal 30 is below a value of about 60 milliamps, the control apparatus operates in the brake mode and for a P signal above this value of 60 milliamps, the control apparatus operates in the power mode.

Figure 5:
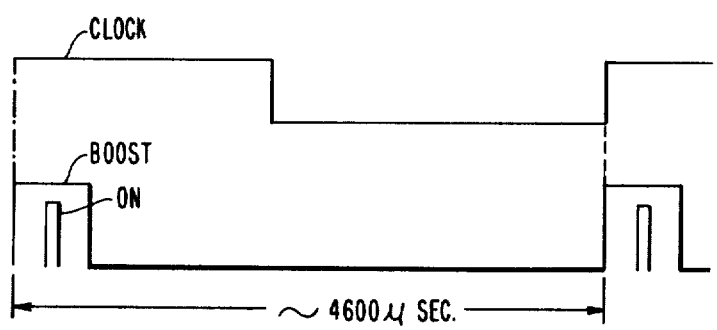
FIG. 5 shows the time relationships of the prior art boost pulse, the ON signal within the boost pulse and the clock pulse.

The boost pulse signal is developed during every cycle of the program operation. The start of the boost pulse as shown in FIG. 5 is provided in response to the clock pulse. The position of the ON signal within the boost pulse is determined by the control program. The current request is provided at output 152 going to the digital to analog converter 158 and the analog phase controller 108 shown in FIG. 2 and FIG. 3A. The P signal determines the current request I+ to the analog phase controller for establishing the ratio of ON to OFF operation of the chopper. The end of the boost pulse is determined by the control program.

Figure 6:
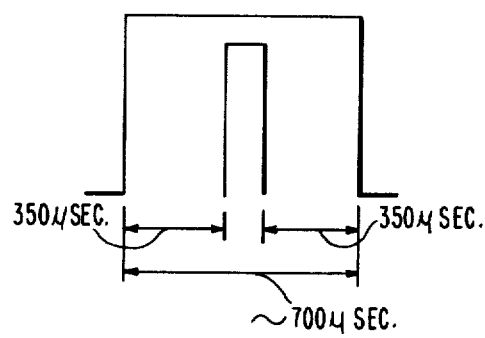
FIG. 6 shows in greater detail the prior art time relationships of the boost pulse and the ON signal within the boost pulse as shown in FIG. 5.

The boost signal provides a protection time band during which an OFF pulse cannot be provided, which protection time band is selected in relation to the known operational speed of the microprocessor such that an OFF pulse cannot occur within a known time period before the ON pulse and within a known time period after the ON pulse as illustrated in FIG. 6. The guard protection time band is provided to the analog system operation, since the boost is used to release the OFF pulse. The OFF pulse can be defeated during the boost signal interval, and the ON pulse can be suppressed by the SUPPRESS signal from the digital output 104 if desired for some reason. An OFF pulse is allowed only outside of the boost signal, and the position of the boost signal protects the ON pulse in this regard, and thus the main chopper circuit.

The output 154 shown in FIG. 2 provides the boost signal to the buffer 156 and the analog phase controller 108. The microprocessor operates in a time sequential manner. The prior art chopper control apparatus provided the boost signal and the ON pulse position relationship generally as shown in FIG. 6.

The analog phase controller 108 can respond to an OFF pulse anywhere between the falling edge of one boost signal and the leading edge of the next succeeding boost signal, and this establishes the ON/OFF ratio of the chopper since the microprocessor puts out the ON pulse shown as $\phi_0$ in FIG. 1 and it puts out the boost pulse. The phase controller cannot fire the OFF pulse before the falling edge and cannot fire after the leading edge of the boost pulse, so the boost pulse in effect determines a dead band. The boost pulse can be determined to have a known time duration and the time cycle of the boost pulses is determined by the clock pulse rate. The analog phase controller can fire the OFF pulse anywhere during the total time cycle other than during the boost pulse. The ON pulse is timed by the microprocessor to be within the boost pulse, as shown in FIG. 6. This time relationship is required to allow the thyristor circuit of the chopper to complete the last received command signal; for example, after an OFF pulse is given to the thyristor T2 then the provided time period is required before an ON pulse can be given to thyristor T1 to permit the chopper circuitry to reset properly for this operation. If the OFF pulse is not specifically suppressed before the leading edge of the next boost pulse, then an OFF pulse is fired by the phase controller, and after the leading edge of the boost pulse an ON pulse can be fired, if allowed. Normally, this ON pulse is allowed, but the ON pulse can be suppressed independently as well as the OFF pulse can be suppressed if desired. But in normal operation, the leading edge of the boost would be followed after a provided time period by the ON pulse, and after another provided time period the falling edge of the boost pulse is provided, with the phase controller establishing the desired ON/OFF time ratio by appropriately firing the OFF pulse in accordance with the current request signal I+.

The digital output provides the boost pulse to the analog phase controller. The clock initiates each program cycle and at the beginning of each cycle provides the leading edge of the boost as shown in FIG. 5, then the microprocessor provides the ON pulse and provides the trailing edge of the boost pulse. After the boost interval, the program goes through its desired operations before the next boost pulse.

Figure 7:
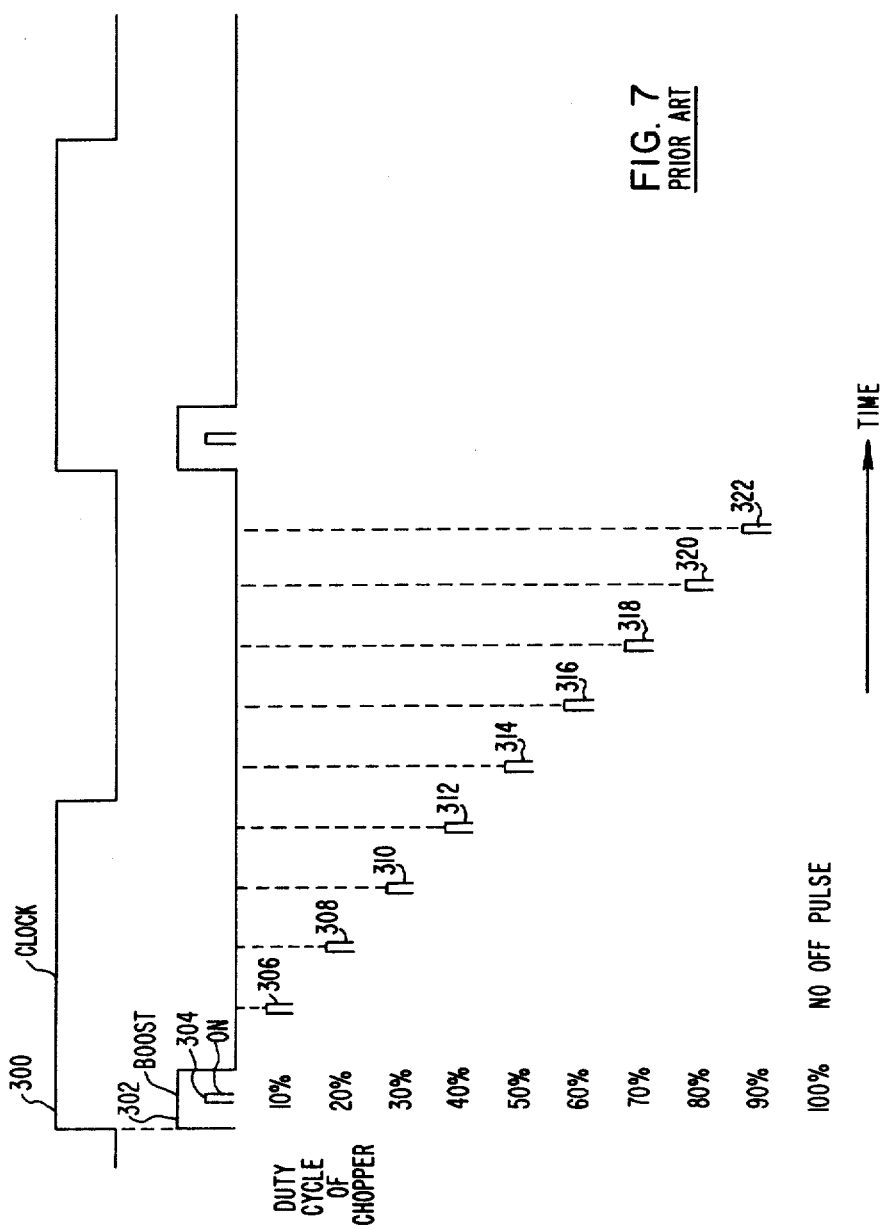
FIG. 7 shows the well-known position relationships of the prior art ON control pulse in relation to various OFF control pulses for providing respective desired duty cycles for the chopper apparatus.

In FIG. 7 there is shown in general the wellknown prior art provision of ON control pulses in relation to the OFF control pulses for providing desired duty cycles for the chopper apparatus. The clock pulse 300 initiates the provision of the boost pulse 302 with the ON pulse 304 provided more or less in the center of the boost pulse. If a 10% duty cycle of the chopper apparatus is desired, the OFF pulse 306 is provided. If a 20% duty cycle is desired, the OFF pulse 308 is provided. If a 30% duty cycle is desired, the OFF pulse 310 is provided. If a 40% duty cycle is desired, the OFF pulse 312 is provided. If a 50% duty cycle is desired, the OFF pulse 314 is provided. If a 60% duty cycle is desired, the OFF pulse 316 is provided. If a 70% duty cycle is desired, the OFF pulse 318 is provided. If an 80% duty cycle is desired, the OFF pulse 320 is provided, and if a 90% duty cycle is desired, the OFF pulse 322 is provided. For a 100% duty cycle of the chopper apparatus, no OFF pulse is provided.

In FIG. 8, there is illustrated the extended time duration boost pulse in accordance with a first embodiment of the present invention where the clock pulse 300 initiates the boost pulse 330; however, the ON pulse 332 has been delayed by extending the portion of the boost pulse 330 prior to the occurrence of the ON pulse 332 in relation to the portion of the boost pulse 330 following the ON pulse 332. In FIG. 8, the second clock pulse 340 is shown to initiate a normal boost pulse 342 without such an extended time duration before the ON pulse and with the ON pulse 346 positioned as shown in FIG. 7.

In Appendix A there is shown a control program listing in accordance with the first embodiment which operates with the microprocessor 94 to sense the average of the motor currents I1 and I2 to determine if a normal or an extended boost pulse is provided. If the acutal value of the average motor current is above a predetermined reference value, such as 100 amperes, then a normal boost pulse B as shown in FIG. 8 is provided. If the actual value of the average motor current is below this reference value, such as 100 amperes, an extended boost pulse A as shown in FIG. 8 is provided. A normal time delay after the beginning of the boost pulse is about 386 microseconds for an above 100 amperes average motor current, and the extended time delay is about 539 microseconds for a below 100 amperes average motor current.

In FIG. 9, there is shown the extended boost pulse 330 of FIG. 8 with the ON pulse 332 positioned such that the portion of the boost pulse 330 prior to the occurrence of the ON pulse 332 has approximately a 539 microsecond extended time duration while the portion of the boost pulse 330 subsequent to the ON pulse 332 has the normal 386 microsecond time duration provided by the control program of Appendix A.

Figure 10:
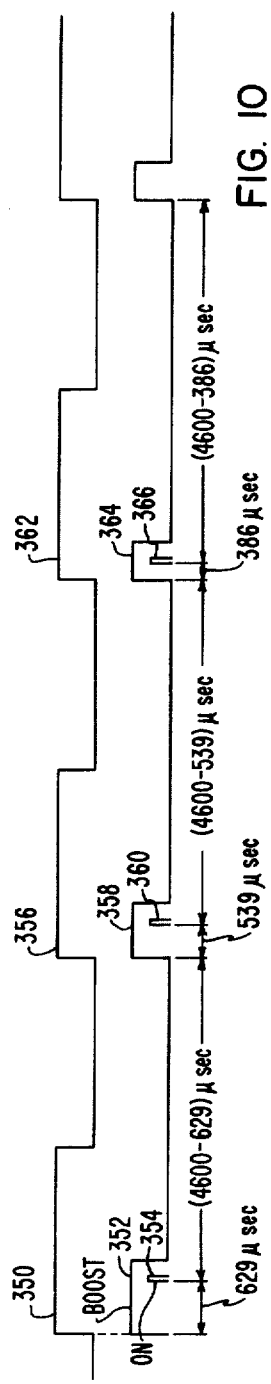
FIG. 10 illustrates a modified adaptive adjustment of the boost pulse time duration in relation to the sensed motor current.

In FIG. 10, there is shown the adaptive adjustment of the boost pulse time duration in accordance with a second embodiment of this invention and in relation to the sensed average motor current. The clock pulse 350 initiates a boost pulse having one of a normal time delay after the beginning of the boost pulse, a first time delay or a second larger time delay depending upon the average motor current value. For the illustration of FIG. 10, the boost pulse 352 has the second time delay of about 629 microseconds prior to the occurrence of the ON pulse 354 and this enables a longer duration of the OFF cycle of the chopper apparatus for increasing the charge voltage on the commutation capacitor for particularly low motor current conditions of operation. The next clock pulse 356 initiates a boost pulse 358 which has a first time delay of about 539 microseconds prior to the occurrence of the ON pulse 360. The next clock pulse 362 initiates the boost pulse 364 which has the normal 386 microsecond time duration of the boost pulse prior to the occurrence of the ON pulse 366.

In Appendix B there is shown a control program listing in accordance with this second embodiment of this invention, and which operates with the microprocessor 94 to sense the actual average motor current to determine of a normal boost pulse, a first time delay boost pulse or a second time delay boost pulse is desired. If the actual average motor current is above a first predetermined reference value, such as 100 amperes, then a normal boost pulse 364 is provided. If the actual average motor current is less than the first reference value of 100 amperes and above a second predetermined reference value, such as 50 amperes, then the first time delay boost pulse 358 is provided. If the average motor current is less than the second predetermined reference value, then the second time delay boost pulse 352 is provided.

Figure 11:
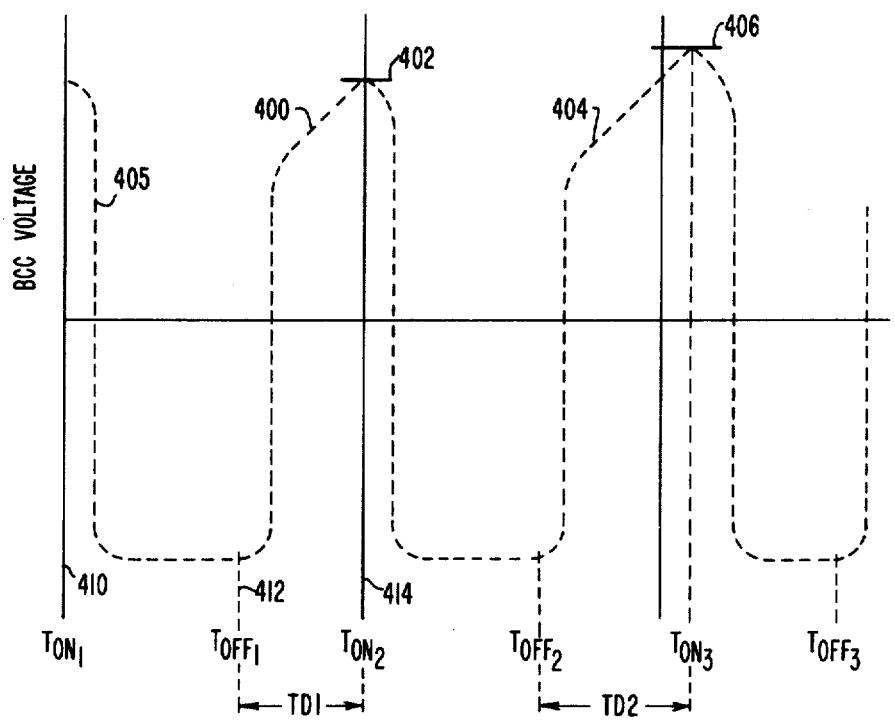
FIG. 11 shows the charge voltage provided across the commutation capacitor of the chopper apparatus in relation to the ON and OFF operations of the chopper apparatus.

In FIG. 11, there is shown the charge voltage build-up across the commutation capacitor in relation to the ON and OFF operations of the chopper apparatus, with the time duration TD1 between the OFF pulse TOFF$_1$ and the next ON pulse TON$_2$ being in accordance with the normal boost pulse 364 and ON pulse 366 relationship shown in FIG. 10 while the time duration TD2 between the OFF pulse TOFF$_2$ and the subsequent ON pulse TON$_3$ is greater and in accordance with one of the relationships of the boost pulse 358 to the ON pulse 360 or the boost pulse 352 with the ON pulse 354. The curve portion 400 is shown to bring the charge voltage across the capacitor to a level 402 whereas the curve portion 404 shows an extended commutation capacitor charge resulting in a higher charge voltage level 406 on the commutation capacitor.

As shown in FIG. 11, the commutation capacitor BCC voltage level 405 goes down about 15% when an ON pulse 410 is fired. During the next OFF cycle initiated by the OFF pulse 412, this charge voltage drops back about 15% followed by a linear recharge 400 up to line voltage 402. However, at low motor current, due to the I$^2$R energy losses and at constant current of the motor circuit, this line voltage might not be reached if the ON pulse is fired too soon, such as ON pulse 414 following the OFF pulse 412 with the result that the BCC charge voltage on the commutation capacitor over several program cycles can keep getting smaller and smaller with the waveform 405 telescoping towards zero. A minimum charge voltage on the commutation capacitor is required to be reasonably certain that the chopper can be turned OFF before allowing the chopper to go ON. Otherwise, fault conditions might result. At higher motor currents, it is known that so many volts allows so many amperes, for example, 500 volts charge on a commutation capacitor will commutate 1000 amperes of motor current. As the motor current gets higher, this BCC charge voltage must go higher. On the other hand, at low motor currents, sufficient time is required for the recharge of the commutation capacitor to reach an adequate commutation voltage.

Figure 12:
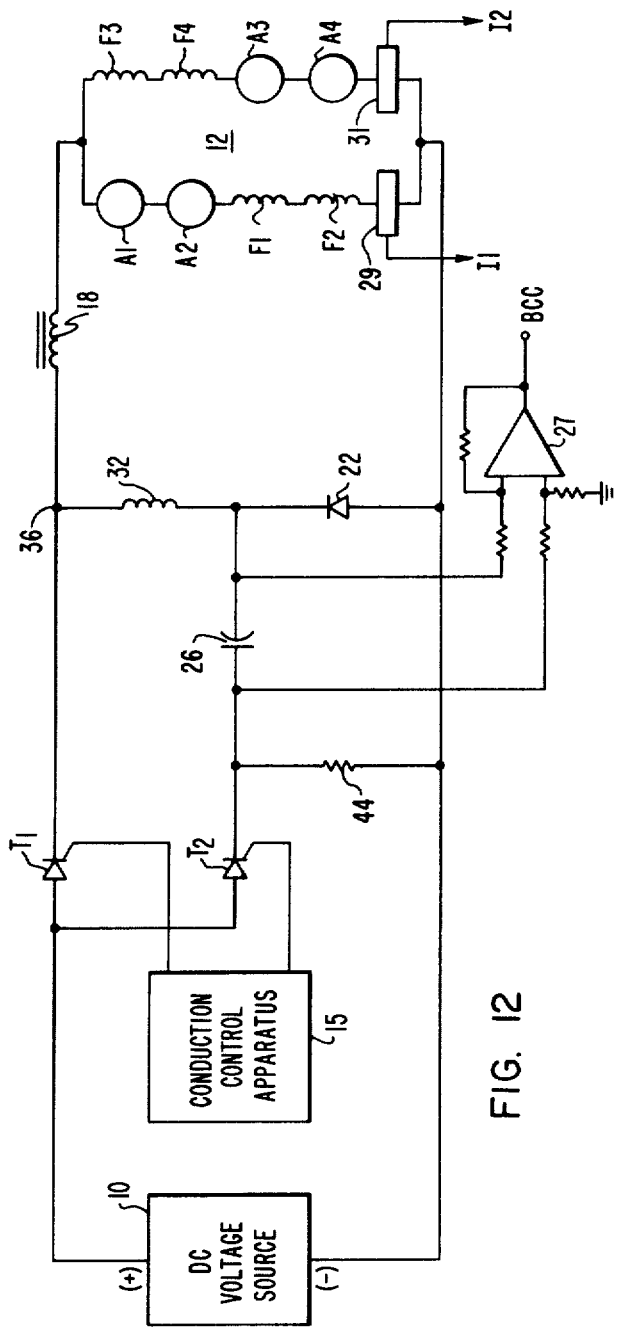
FIG. 12 shows a suitable circuit arrangement for sensing the charge voltage of the commutation capacitor.

In FIG. 12, there is shown a suitable circuit arrangement for sensing the charge voltage BCC of the commutation capacitor and the currents I1 and I2 in the respective motor branches. As described in the above cross-referenced patent application Ser. No. 968,950, a direct current chopper apparatus is shown for controlling the average current supplied from a direct current source 10 to a DC series motor load circuit 12 which motor load circuit includes parallel branches well known to persons skilled in this art and described in the above-referenced article published in the Westinghouse Engineer for March, 1973. A main thyristor switch device T1 repetitively operates in an ON condition and an OFF condition to chop the voltage applied to the motor load 12. The control of this voltage is determined by changing the ON operation time in relation to the OFF operation time of the conduction of the main thyristor T1 for controlling the speed of the motors in the motor load circuit 12. To reduce the speed of the motors, the armature voltage is decreased and to increase the motor speed, the armature voltage is increased. The main thyristor switch T1 is gated ON to become conductive and subsequently commutated OFF to open and block as required to provide an average voltage across the motor load 12 which determines the motor speed. Each time the main thyristor T1 conducts, the voltage across the motor load 12 and the inductor 18 rises to the voltage of the power supply 10. Each time the main thyristor T1 blocks, the voltage across the motor load circuit 12 and the inductor 18 falls to zero, the motor load 12 responds to the average motor voltage. The main thyristor switch T1 requires a commutation circuit to become blocked when it is desired that the main thyristor switch T1 no longer conduct current to the motor load 12. The commutation circuit includes a parallel connected commutating capacitor 26 and a commutating thyristor switch T2 operative to shunt the motor current and stop conduction of the main thyristor switch T1. To block the main thyristor switch T1 and stop conduction of motor current by the main thyristor switch T1, the commutating thyristor T2 is gated to conduct and applies a reverse bias voltage from the capacitor 26 across the main thyristor switch T1 to block the thyristor switch T1.

The voltage charge across the commutation capacitor 26 is shown measured with a well-known differential amplifier 27, and the ON pulse of the chopper apparatus as shown in FIG. 10 can be delayed in relation to the sensed value of this charge voltage across the commutating capacitor 26. The motor current I1 through the motor circuit branch including the armatures A1, A2 and the fields F1 and F2 is provided by a current sensing Hall effect transducer 29, and the motor current I2 through the branch circuit including the motor armatures A3 and A4 and the motor fields F3 and F4 is provided by a current sensing Hall effect transducer 31.

A dynamic brake build-up problem can result from the chopper attempting to stay ON too long during a desired brake current build-up operation. The chopper by staying ON too long reduces the voltage charge on the commutation capacitor to a level where an entire ON cycle has to be skipped. Since every ON cycle extracts $I^2R$ losses from the commutation circuit and every OFF cycle includes a recharge period as a function of the current of the motor, if the motor current is high enough, then every OFF cycle of the chopper recharges the commutation capacitor adequately to line voltage and proper commutation operation of the main thyristor T1 is enabled. However, when the motor current becomes low, such as when a brake build-up is attempted, the OFF pulse cycle might not fully recharge the capacitor adequately and the ON pulse can occur too soon before an adequate recharge of the commutation capacitor is effected. Then the next OFF pulse cycle starts from an even lower voltage level and this OFF cycle does not make up the voltage charge on the commutation capacitor that is lost by the previous ON cycle. The result of such successive cycles of operation when the motor current is low is the voltage across the capacitor can drop down to a level where further ON cycle operation of the chopper is prevented because the sensed BCC voltage across the commutation capacitor is too low to safely permit continued ON cycle operation of the chopper. Since the microprocessor senses the motor current, a predetermined low value of the motor current can be selected such as 100 amperes for a well-known Westinghouse Type 1462 propulsion motor, where the initial portion of the boost pulse can be extended after the last OFF pulse and before the next ON pulse occurs by an amount determined by the sensed motor current value. By extending the front portion of the boost pulse as shown in FIG. 10, this in effect delays the next ON pulse to restrict the amount of time the main thyristor is ON and to increase the amount of time the main thyristor is OFF which enables a longer voltage charge recycle in relation to the commutation capacitor. This increase in OFF time increases the commutation capacitor charge voltage to a level such that it will not stop the desired operation of the chopper. In this way, the control apparatus senses a predetermined low motor current, such as 100 amperes, and extends the front portion of the boost pulse before providing an ON pulse. It is within the scope of the present invention to sense a predetermined function of the motor current rather than to sense one predetermined low level of motor current. The ON and OFF time relationship of the chopper apparatus can be varied to maintain the desired brake motor current which builds during the ON cycle, and maintain the desired commutation capacitor charge voltage that builds during the OFF cycle.

In accordance with the first and second embodiments of the present invention, the average motor current is sensed to determine a front extension of the boost pulse, such as illustrated in FIG. 8 and in FIG. 10, to assure an adequate BCC charge voltage which may not get back up to line voltage but is sufficient, such as 400 volts, for a predetermined low motor current to control the chopper OFF operation. By sensing the motor current and providing a known extension of the front portion of the boost pulse before the ON pulse occurs for a predetermined low motor current, the BCC charge voltage may telescope down to a predetermined charge voltage level, for example, 400 volts and maintain that 400 volts in response to this predetermined low motor current. The ON pulse is fired on a time base by the computer and the front portion of the boost pulse is extended to increase the time duration between the last OFF pulse and the firing of the succeeding ON pulse when a predetermined low motor current is sensed and as required to enable an adequate charge of the commutation capacitor.

Figure 13:
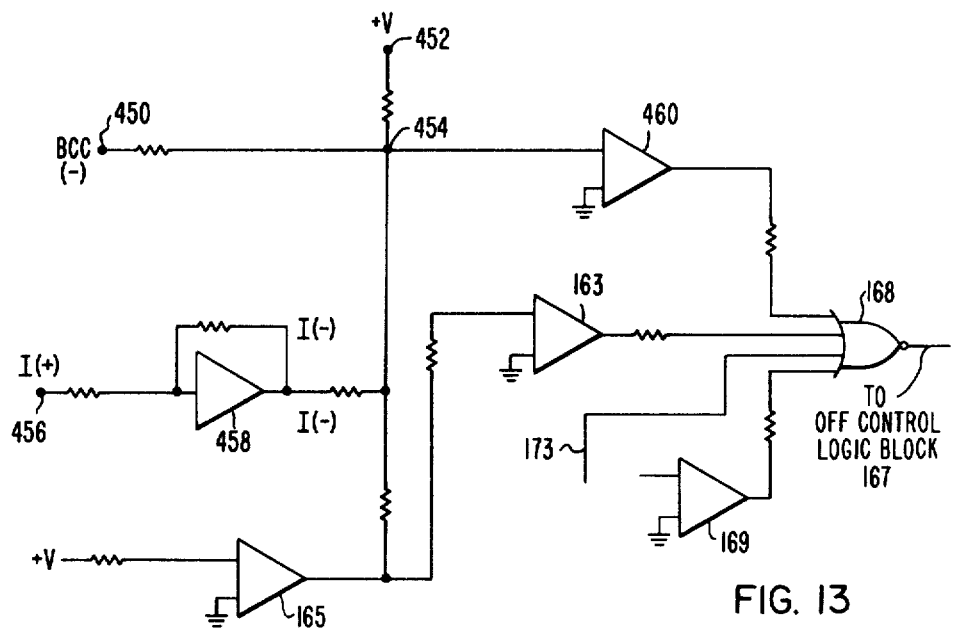
FIG. 13 shows a different embodiment of the present invention including a modification of the hardware interface shown in FIG. 3A to provide a comparison of sensed motor current with the charge voltage of the commutation capacitor for determining the chopper OFF time by controlling the time occurrence of the OFF control pulse in relation to the ON pulse.

A third embodiment of the present invention is shown in FIG. 13 and responds to a sensed BCC charge voltage across the commutation capacitor and a sensed motor current to control the provision of the OFF control pulse in relation to the boost pulse. The sensed BCC charge voltage on the commutation capacitor is compared with a sensed motor current, such as I1, to establish the time occurrence of the OFF control pulse in relation to the provision of the boost pulse.

In FIG. 13 there is shown a modification of the hardware interface apparatus shown in FIG. 3A for comparing a sensed actual motor current, such as I1, with the sensed actual BCC voltage. The actual BCC negative voltage is applied to terminal 450 and a positive offset voltage V+, in accordance with a desired reference value of the BCC voltage, is applied to the terminal 452, such that the actual BCC voltage has to remain more negative than this positive offset reference voltage V+ to enable continued ON operation of the chopper. In addition, the timing ramp voltage from amplifier 165, which is reset by the microprocessor each 218 Hertz, is added at junction 454 so in relation to each time the ramp voltage builds up then enough actual BCC negative voltage is required to prevent the provision of an OFF control pulse thereby. The actual positive motor current I1 is applied to terminal 456 and made negative by circuit 458 to negate the positive ramp voltage, such that if the actual motor current stays greater than a predetermined reference level, such as 100 amperes, this will remove the effect of the ramp voltage from the comparator 460. If the actual motor current is lower than this reference level, the ramp comes into effect and additional actual BCC negative charge voltage is then needed to overcome the positive ramp voltage and with time as the ramp builds up to avoid an OFF control pulse being fired. Thusly, in operation this OFF pulse control apparatus will determine if the actual motor current is below a predetermined reference level, such as 100 amperes, when the ramp voltage becomes effective to provide the OFF control pulse earlier and move away from the normal boost pulse to give a longer OFF time period for building up the commutation capacitor charge voltage.

A fourth embodiment of the present invention is shown in FIG. 14 and is another modification of the hardware interface apparatus shown in FIG. 3A, and responds to sensed actual BCC negative commutation capacitor charge voltage applied to terminal 470. A sampling switch 472 is closed each time an ON control pulse is provided and the BCC voltage has stabilized. The summing junction 474 compares the actual BCC voltage with a positive reference voltage applied to terminal 476 and corresponding to a desired minimum BCC reference voltage, such as 300 volts. If the sampled BCC actual voltage is less than this minimum reference voltage, the integrator 478 will start integrating negatively. The integrator output is then compared by the comparator 480 with the positive voltage ramp from the amplifier 165, such that as the integrator output voltage drops negatively, it starts to intersect with the positive ramp voltage and the OFF pulse is provided in a time relationship more away from the ON pulse to in effect increase the OFF time period of the chopper apparatus. When the OFF pulse is pulled back in time far enough from the ON pulse for the actual BCC charge voltage to build up to at least the desired minimum reference level, such as 300 volts, then the sampling switch 472 would sense this adequate actual BCC voltage charge and the integrator 478 would then hold its output to maintain that desired minimum level of BCC charge voltage.

The application program listings included in the Appendix A and Appendix B are written in the assembly language developed for use with the Intel 8080 microprocessor, such as the central processor 94.

APPENDIX A

```
00001INT:    PUSH    B
00002        PUSH    D
00003        PUSH    H
00004        PUSH    PSW
00005        MVI     A,68H      ;RESET INT #1
00006        OUT     07H
00007        MVI     0C0H
00008        OUT     20H        ;LOCATION IS INTERUPT
00009        LDA     ?RV0
00010        XRI     20H        ;TOGLE

00001INT:    PUSH    B
00002        PUSH    D
00003        PUSH    H
00004        PUSH    PSW
00005        MVI     A,68H      ;RESET INT #1
00006        OUT     07H
00007        MVI     0C0H
00008        OUT     20H        ;LOCATION IS INTERUPT
00009        LDA     ?RV0
00010        XRI     20H        ;TOGLE
00011        STA     ?RV0
00012        CMA
00013        OUT     08H
00014        LDA     ?ACNT
00015        MOV     C,A
00016        ORI     80H
00017        OUT     32H
00018        MVI     B,14H      ;WAIT 386 USEC
00019        LDA     ?IM
00020        CPI     19H        ;I > 100 AMPS ?
00021        JNC     NCHG       ;YES
00022        MVI     B,28H      ;WAIT 539 USEC
00023NCHG:   DCR     B
00024        JNZ     *-1
00025        CALL    MONT
00026        LDA     ?T6FLG     ;CHECK T6 SUPRESS
00027        ANI     0FFH
00028        JNZ     T6SUP      ;JUMP IF T6 SUPRESSED
00029        LDA     ?BCO
00030        ORI     40H        ;TURN T6 ON
00031        CMA
00032        OUT     0AH
00033T6SUP:  MOV     A,C        ;GET ?ACNT
00034        ORI     0C0H       ;SET BOOST.ON.T6SUP
```

```
00034     OUT      32H
00035     ANI      0BFH      ;READY CLEAR ON
00036     MVI      B,08H     ;WAIT 72 USEC
00037     DCR      B
00038     JNZ      $-1
00039     OUT      32H       ;CLEAR ON
00040     LDA      ?BCO
00041     ANI      0BFH      ;TURN T6 OFF
00042     CMA
00043     OUT      0AH
00044     CALL     DIGIN     ;GET DIGITAL INPUTS
00045     MVI      B,15H     ;WAIT 272 USEC
00046     DCR      B
00047     JNZ      $-1
00048     MOV      A,C
00049     ANI      3FH       ;CLEAR BOOST,ON
00050     OUT      32H
```

APPENDIX B

```
00001 INT:  PUSH     B
00002       PUSH     D
00003       PUSH     H
00004       PUSH     PSW
00005       MVI      A,68H     ;RESET INT #1
00006       OUT      07H
00007       MVI      0C0H
00008       OUT      20H       ;LOCATION IS INTERUPT
00009       LDA      ?RV0
00010       XRI      20H       ;TOGLE
00011       STA      ?RV0
00012       CMA
00013       OUT      08H
00014       LDA      ?ACNT
00015       MOV      C,A
00016       ORI      80H
00017       OUT      32H
00018       MVI      B,14H     ;WAIT 386 USEC
00019       LDA      ?IM
00020       CPI      19H       ;I > 100 AMPS ?
00021       JNC      GTHAN     ;YES
00022       MVI      B,28H     ;WAIT 539 USEC
00023       CPI      0DH       ;> 50 AMPS ?
00024       JNC      GTHAN     ;YES
00025       MVI      B,3CH     ;WAIT 629 USEC
00026 GTHAN: DCR     B
```

```
00027        JNZ     $-3
00028        CALL    MONT
00029        LDA     ?T6FLG  ;CHECK T6 SUPRESS
00030        ANI     0FFH
00031        JNZ     T6SUP   ;JUMP IF T6 SUPRESSED
00032        LDA     ?BCO
00033        ORI     40H     ;TURN T6 ON
00034        CMA
00035        OUT     0AH
00036 T6SUP  MOV     A,C     ;GET ?ACNT
00037        ORI     0D0H    ;SET BOOST ON T5SUP
00038        OUT     32H
00039        ANI     0BFH    ;READY CLEAR ON
00040        MVI     B,08H   ;WAIT 72 USEC
00041        DCR     B
00042        JNZ     $-1
00043        OUT     32H     ;CLEAR ON
00044        LDA     ?BCO
00045        ANI     0BFH    ;TURN T6 OFF
00046        CMA
00047        OUT     0AH
00048        CALL    DIGIN   ;GET DIGITAL INPUTS
00049        MVI     B,15H   ;WAIT 272USEC
00050        DCR     B
00051        JNZ     $-1
00052        MOV     A,C
00053        ANI     3FH     ;CLEAR BOOST ON
00054        OUT     32H
```

We claim:

1. In control apparatus for a chopper having an ON operation and an OFF operation, said chopper having a commutation capacitor with a charge voltage and being operative to control the energization current of an electric motor, the combination of:

means for providing a first pulse signal for determining the ON operation of said chopper, means for providing a second pulse signal for determining the OFF operation of said chopper, means for comparing the actual value of at least one of said charge voltage and said motor current with a predetermined reference value, and controlling the time period relationship between said second pulse signal and said first pulse signal to increase the charge voltage when said actual value is less than said predetermined reference value.

2. The control apparatus of claim 1, with said first pulse signal having a first time period, said control apparatus including, means for providing a third pulse signal having a second time period greater than said first time period and with the first time period being provided within the second time period, and controlling said relationship by increasing the second time period prior to the provision of said first pulse signal.

3. The control apparatus of claim 1, with controlling said relationship to provide an adaptive extension of the OFF operation of said chopper to increase the charge voltage when said actual value is less than said predetermined reference value.

4. The control apparatus of claim 1, with extending said time period relationship to provide an extension of the OFF operation of the chopper by changing the provision of the second pulse signal in relation to the first pulse signal when said actual value is less than said reference value.

5. The control apparatus of claim 1, with said comparing means being responsive to the actual value of motor current for comparison with a first predetermined reference value for providing a first change in said relationship and being responsive to the actual value of motor current for comparison with a second predetermined reference value for providing a second change in said relationship.

6. In a method of controlling a chopper having an ON operation and an OFF operation to regulate the current of an electric motor, said chopper having a commutation circuit with a charge voltage, the steps of sensing an actual operating condition of said chopper comprising one of the motor current and the charge voltage, providing an ON control signal for determining the ON operation of the chopper, providing an OFF control signal for determining the OFF operation of the chopper, comparing said operating condition with a predetermined reference value of said operating condition, and controlling the time duration between said OFF control signal and said ON control signal to increase the charge voltage when the actual operating condition is less than said reference value.

7. The method of claim 6, with the actual operating condition being the motor current, and with said operating condition being compared with a first reference value of said operating condition for providing a first increase in said time duration and being compared with a second reference value of said operating condition for providing a second and greater increase in said time duration.

8. The method of claim 6, including sensing another actual operating condition of said chopper comprising the other of the motor current and the charge voltage, and controlling said time duration in response to said another actual operating condition.

9. The method of claim 6, with said actual operating condition being the charge voltage, and controlling said time duration such that said charge voltage is made substantially the same as said reference value.

10. The method of claim 6, with the ON control signal having a first time period, and including providing a boost pulse having a second time period greater than the first time period and with the first time period being within the second time period, and controlling an extension of the second time period prior to the first time period in accordance with the difference between the actual operating condition and said reference value.

* * * * *